(12) United States Patent
Schroeder et al.

(10) Patent No.: US 9,912,234 B2
(45) Date of Patent: Mar. 6, 2018

(54) SYSTEMS AND METHODS FOR MITIGATION OF RESISTOR NONLINEARITY ERRORS IN SINGLE OR MULTIPHASE SWITCHING VOLTAGE REGULATORS EMPLOYING INDUCTOR DCR CURRENT SENSING

(71) Applicant: INTERSIL AMERICAS LLC, Milpitas, CA (US)

(72) Inventors: Warren Richard Schroeder, Fuguay Varina, NC (US); Thomas Andrew Jochum, Durham, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 703 days.

(21) Appl. No.: 14/454,219

(22) Filed: Aug. 7, 2014

(65) Prior Publication Data
US 2015/0270770 A1    Sep. 24, 2015

Related U.S. Application Data

(60) Provisional application No. 61/985,191, filed on Apr. 28, 2014, provisional application No. 61/969,741, filed on Mar. 24, 2014.

(51) Int. Cl.
*H02M 3/156*    (2006.01)
*H02M 1/00*    (2006.01)

(52) U.S. Cl.
CPC .... *H02M 3/156* (2013.01); *H02M 2001/0009* (2013.01); *Y10T 307/406* (2015.04)

(58) Field of Classification Search
CPC .... H02M 1/32; H02M 1/4225; H02M 3/1584; H02M 3/33507; H02M 7/217; H05B 33/0815; Y02B 70/126
See application file for complete search history.

(56) References Cited

U.S. PATENT DOCUMENTS

| 5,982,160 | A | 11/1999 | Walters et al. |
| 6,181,120 | B1 | 1/2001 | Hawkes et al. |
| 6,433,525 | B2 | 8/2002 | Muratov et al. |
| 2012/0294048 | A1* | 11/2012 | Brinlee ................... H02M 1/36 363/21.18 |
| 2013/0057169 | A1* | 3/2013 | Harel ................. H05B 33/0815 315/200 R |

* cited by examiner

*Primary Examiner* — Thienvu Tran
*Assistant Examiner* — David M Stables
(74) *Attorney, Agent, or Firm* — Foley & Lardner LLP; Mark J. Danielson

(57) ABSTRACT

Systems and methods for mitigation of resistor nonlinearity errors in a power converter are provided. In at least one embodiment, the power converter comprises at least one power switch coupled to an input voltage, a pulse width modulation (PWM) circuit for generating control pulses for the at least one power switch, at least one output inductor coupled to a respective one of the at least one power switches, a current sensor coupled in parallel with the at least one output inductor, and at least one circuit element. The current sensor comprises at least one capacitor, at least one resistor for each of the at least one output inductors, and is coupled to the PWM circuit at a current bleed node. The at least one circuit element is coupled to the current bleed node and bleeds a bleed current from the current bleed node when a power switch is turned on.

16 Claims, 7 Drawing Sheets

SYSTEMS AND METHODS FOR MITIGATION OF RESISTOR NONLINEARITY ERRORS IN SINGLE OR MULTIPHASE SWITCHING VOLTAGE REGULATORS EMPLOYING INDUCTOR DCR CURRENT SENSING

CROSS-REFERENCE TO RELATED APPLICATIONS

This application claims the benefit of U.S. Provisional Patent Application Ser. No. 61/969,741, filed on Mar. 24, 2014, and U.S. Provisional Patent Application Ser. No. 61/985,191, filed on Apr. 28, 2014 which are hereby incorporated herein by reference.

DRAWINGS

Figure 2A:
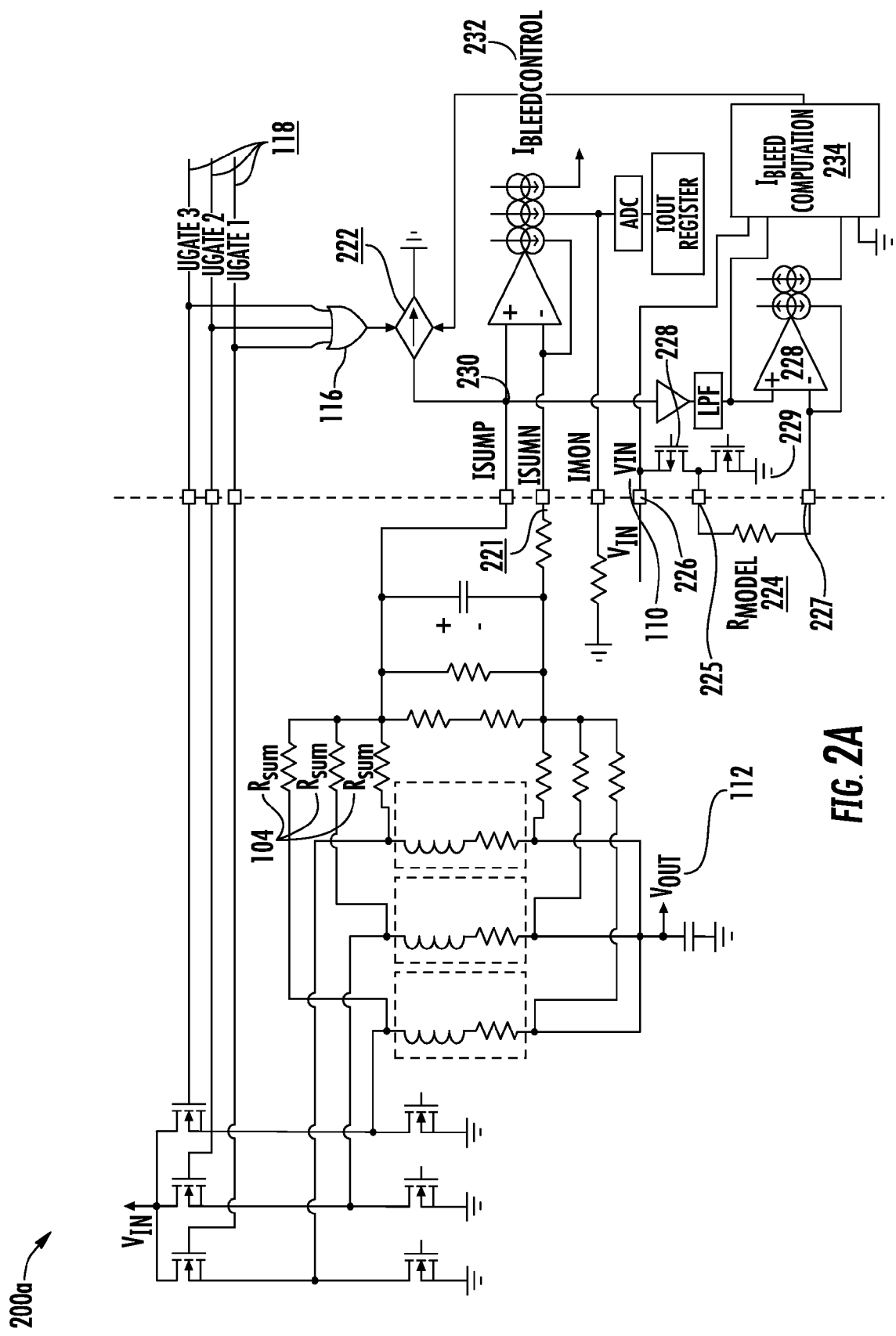
Figure 2B:
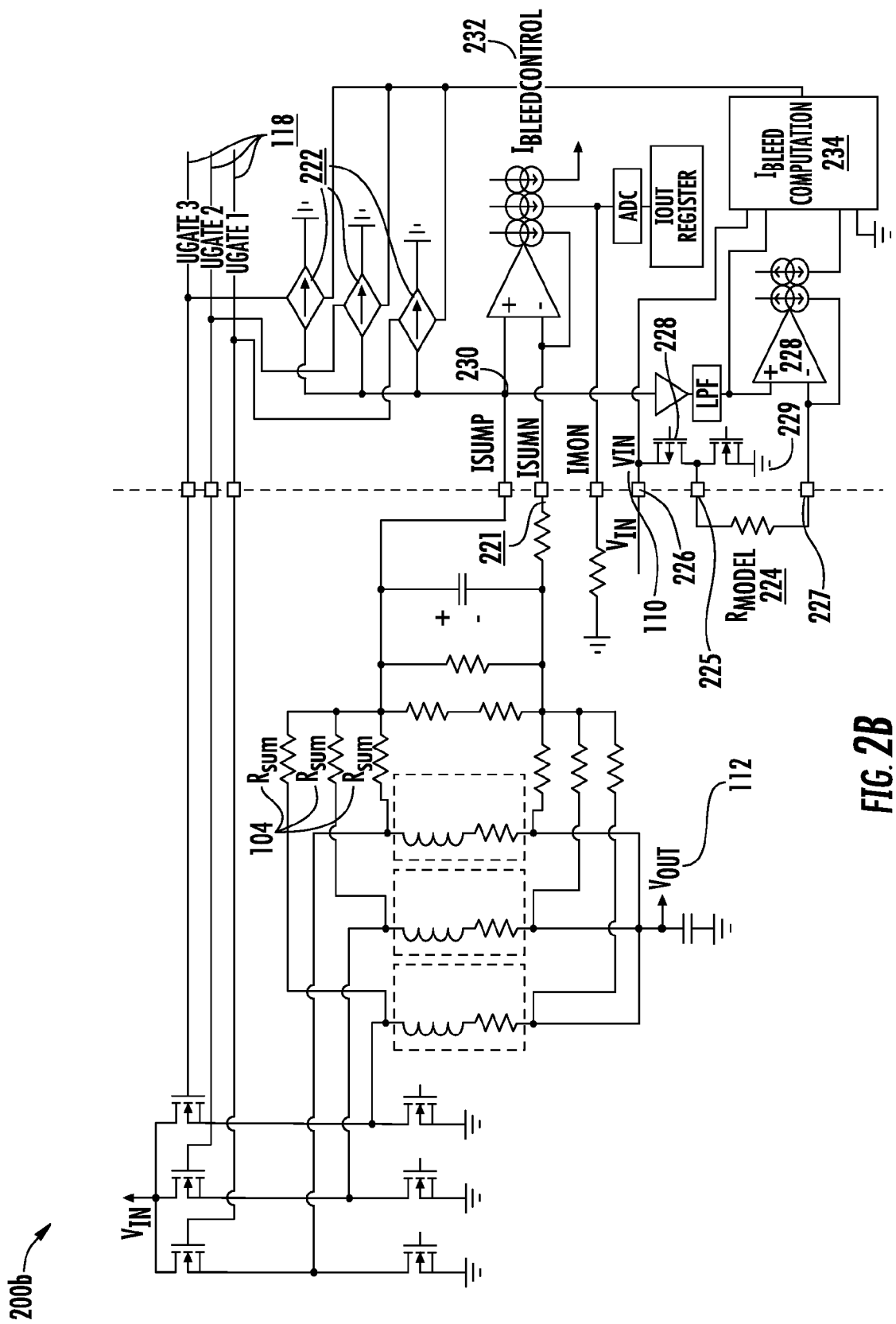
Figure 3A:
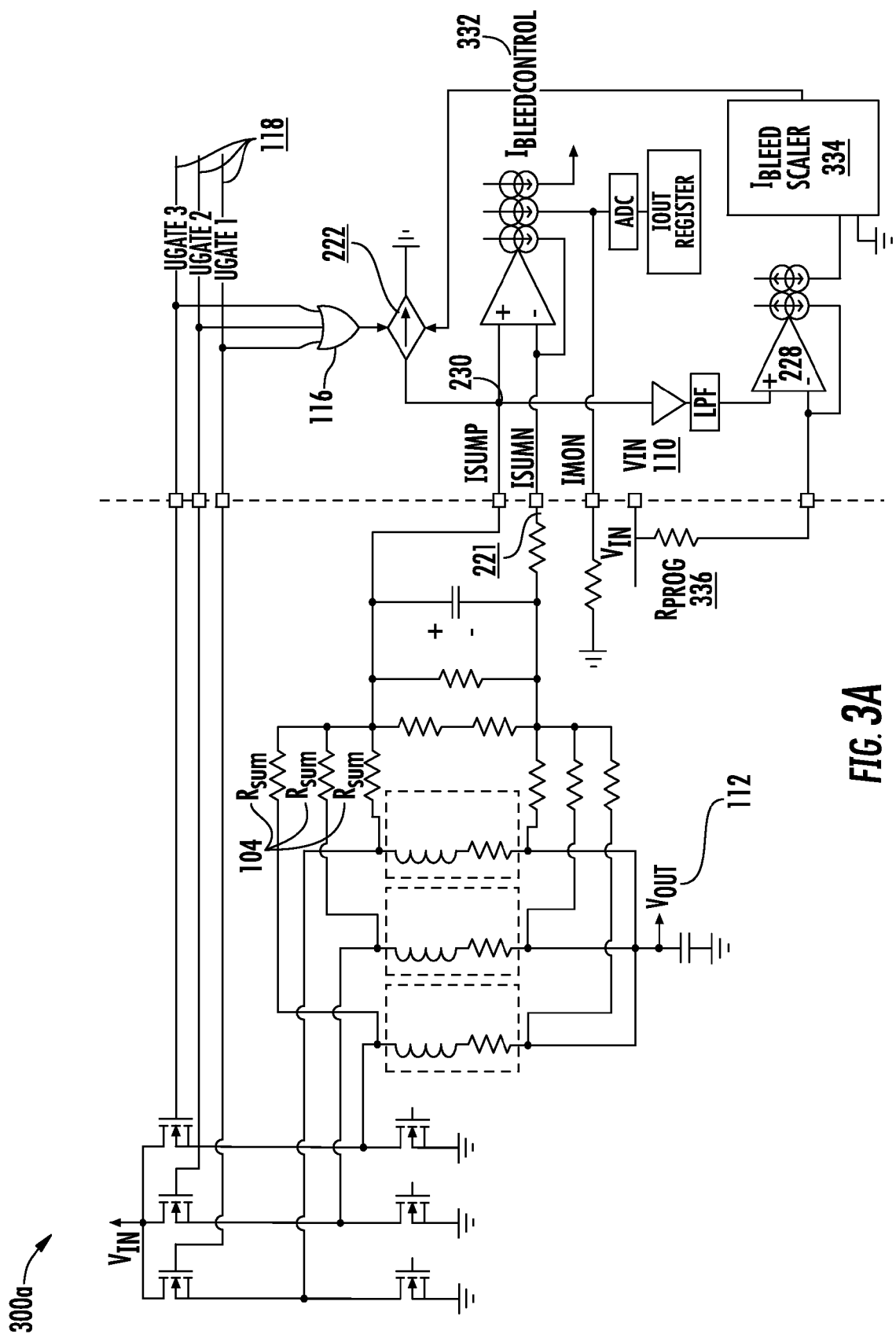
Figure 3B:
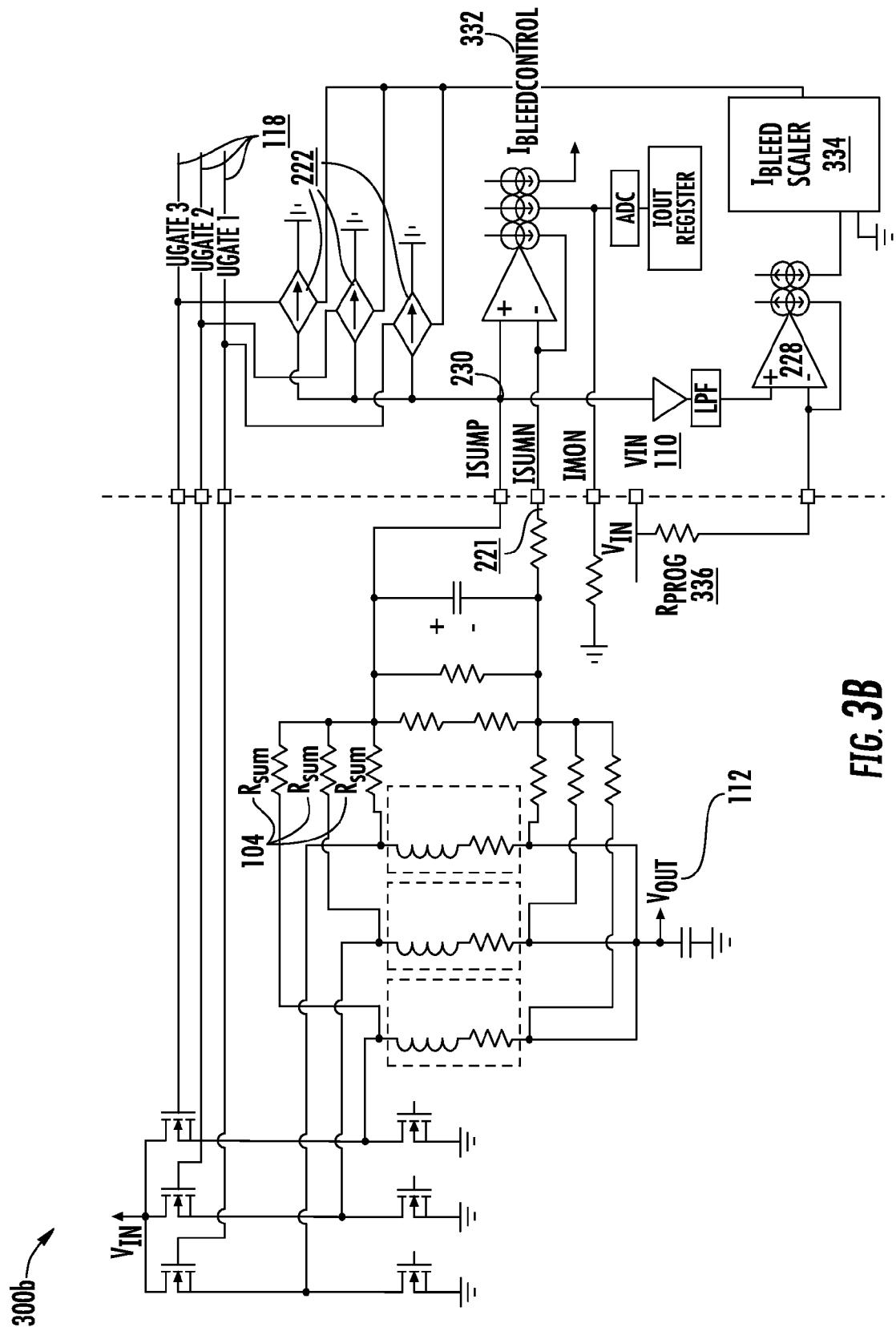
Figure 3C:
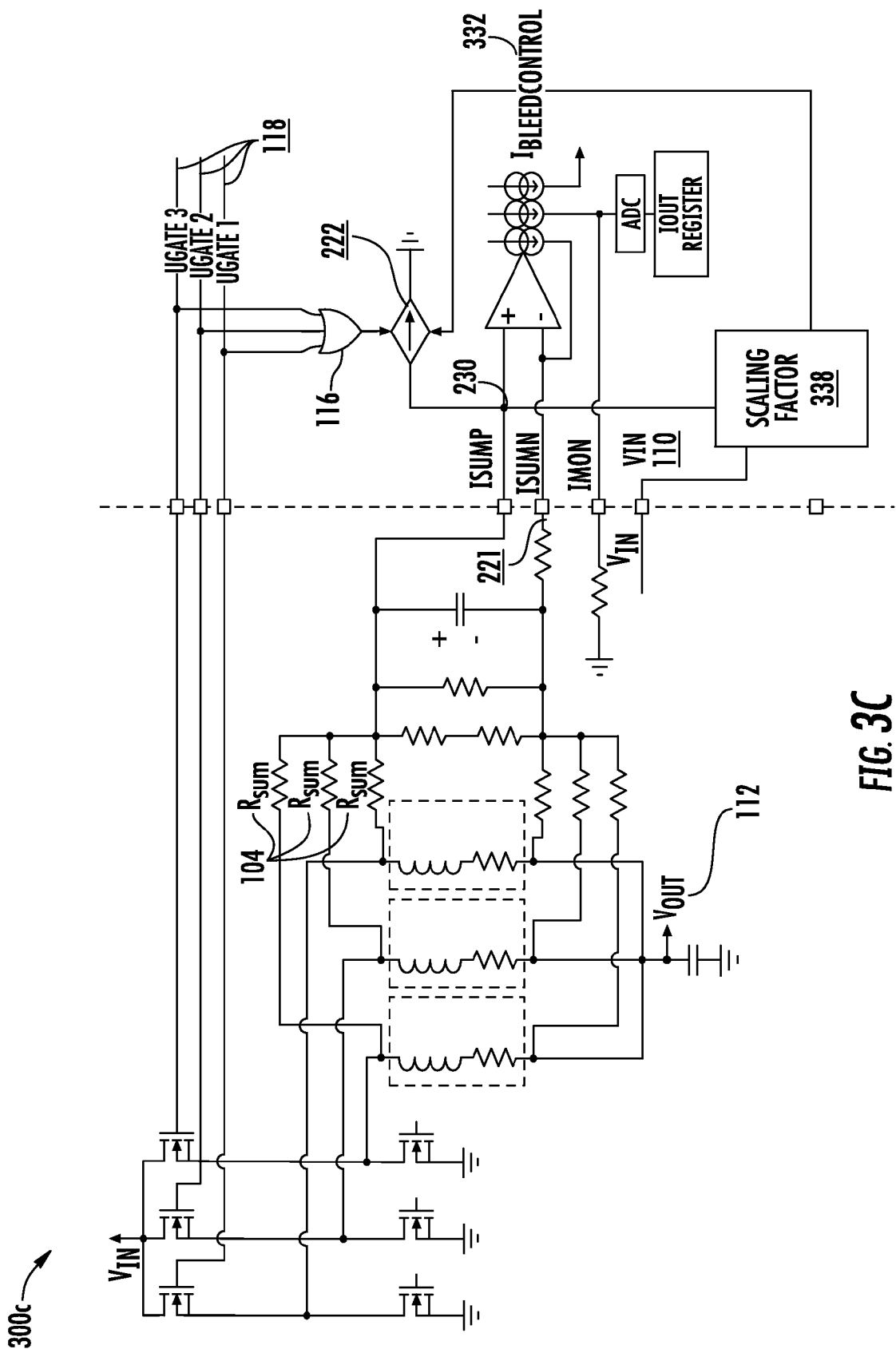
Figure 4:
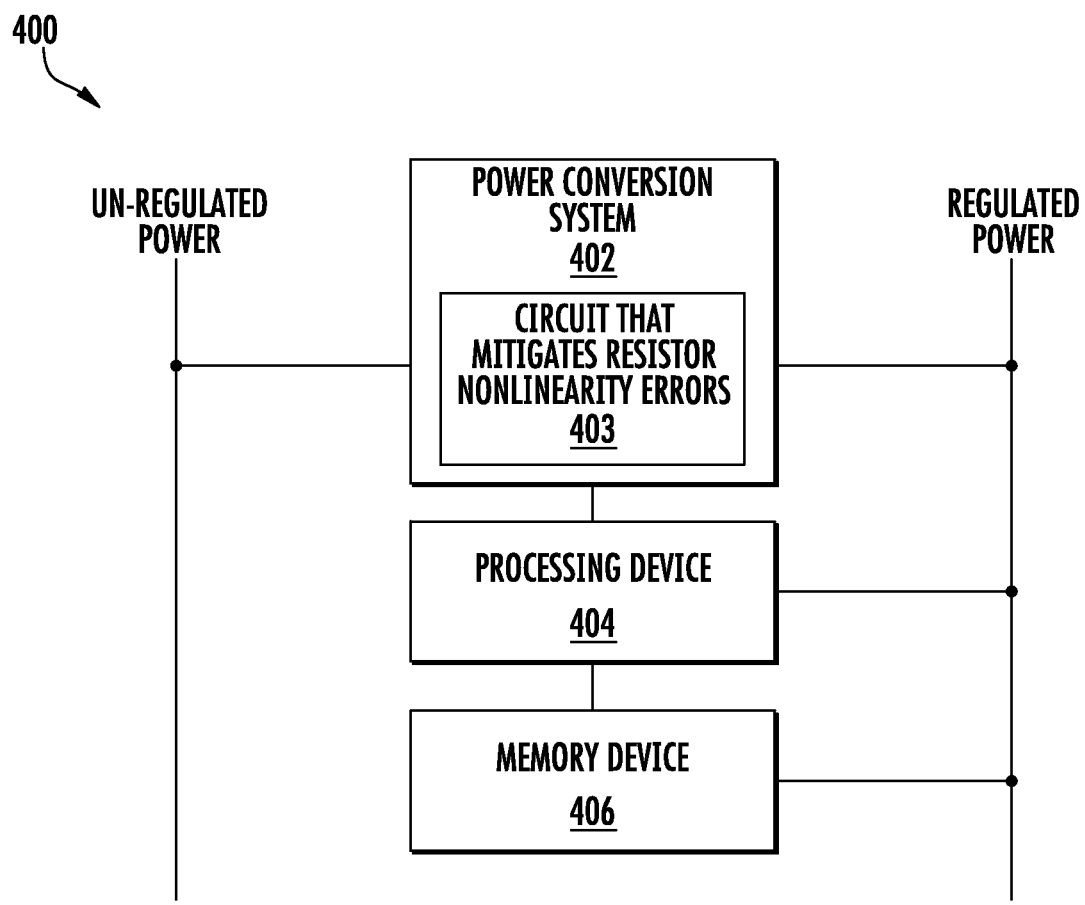

Understanding that the drawings depict only exemplary embodiments and are not therefore to be considered limiting in scope, the exemplary embodiments will be described with additional specificity and detail through the use of the accompanying drawings, in which:

FIGS. 1-3C are diagrams of examples systems used for mitigating the resistor nonlinearity; and FIG. 4 is a block diagram of an example system including a power conversion system that includes a circuit that mitigates resistor nonlinearity.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Direct-current resistance (DCR) current sensing in a switching voltage regulator attempts to produce a voltage signal representing the current through an inductor by processing and/or filtering the voltage drop across the inductor. An example DCR current sensing circuit is described in U.S. Pat. No. 5,982,160 and is incorporated herein by reference. In embodiments that are multiphase voltage regulators where there is one inductor per phase, the processing and/or filtering also contains summing elements such that the resulting voltage signal represents the sum of the currents in all the inductors. Additionally, the processing typically contains a reactive circuit designed to match the time constant of the inductor's inductance and DCR such that the resulting output voltage signal is a true representation of the theoretical voltage drop across the inductor's DCR, but excludes the voltage drop across the inductor's theoretical ideal inductance. With the appropriate scaling, this signal represents the current through the inductor(s). As a result, the inductor current signal can be obtained without introducing power dissipating sense elements into the inductor current path, such as by introducing a current-sense resistor in series with the inductor.

One embodiment of DCR current sensing includes, in addition to possibly other elements, a low pass filter comprised of a resistor and capacitor. In some embodiments, for multi-phase regulators, there can be one filter resistor for each phase and a single common filter capacitor (or multiple parallel capacitors forming a single filter capacitance) for all phases. In buck regulators for computing power, a relatively high voltage drop can be applied across each filter resistor during the relatively brief "on-time" of each phase (i.e., the positive input supply voltage minus the positive output voltage), and a lower negative voltage is applied during the relative longer "off-time" of each phase (i.e., the ground voltage—zero volts—minus the positive output voltage). In many embodiments, the ratio of the on-time to off-time voltages is relatively high. In conventional implementations, the filter resistor is usually assumed to be constant (i.e., has the same value of electrical resistance) during both the on-time and the off-time. However, physical resistors generally do not exhibit constant resistance in response to varying applied voltage. That is, many physical resistors exhibit a slightly lower resistance when a high voltage is applied compared to a slightly higher resistance when a lower voltage is applied. This phenomenon is sometimes referred to as resistance nonlinearity, or is described as a non-zero voltage coefficient of resistance. These terms will be used interchangeably throughout this disclosure. The effect of this nonlinearity in resistivity is an overemphasis in the filter response to the on-time compared to the off-time, which leads to an erroneous representation of the inductor current, typically biased toward a greater than true representation of the inductor current. The embodiments described herein discuss a solution to this problem.

The systems and methods described below provide embodiments to mitigate the current sense error that results from the nonlinear resistance values exhibited between high-voltage "on-states" and lower voltage "off-states" in direct-current resistance (DCR) current sensing. The actual value of the resistance when the lower voltage is applied is herein referred to as the "nominal resistance" and the typically (although not necessarily) lower actual resistance while the higher voltage is applied will be referred to as the "diminished resistance". This is due to the fact that at a higher voltage, the resistance of the resistor is typically lower.

Figure 1:
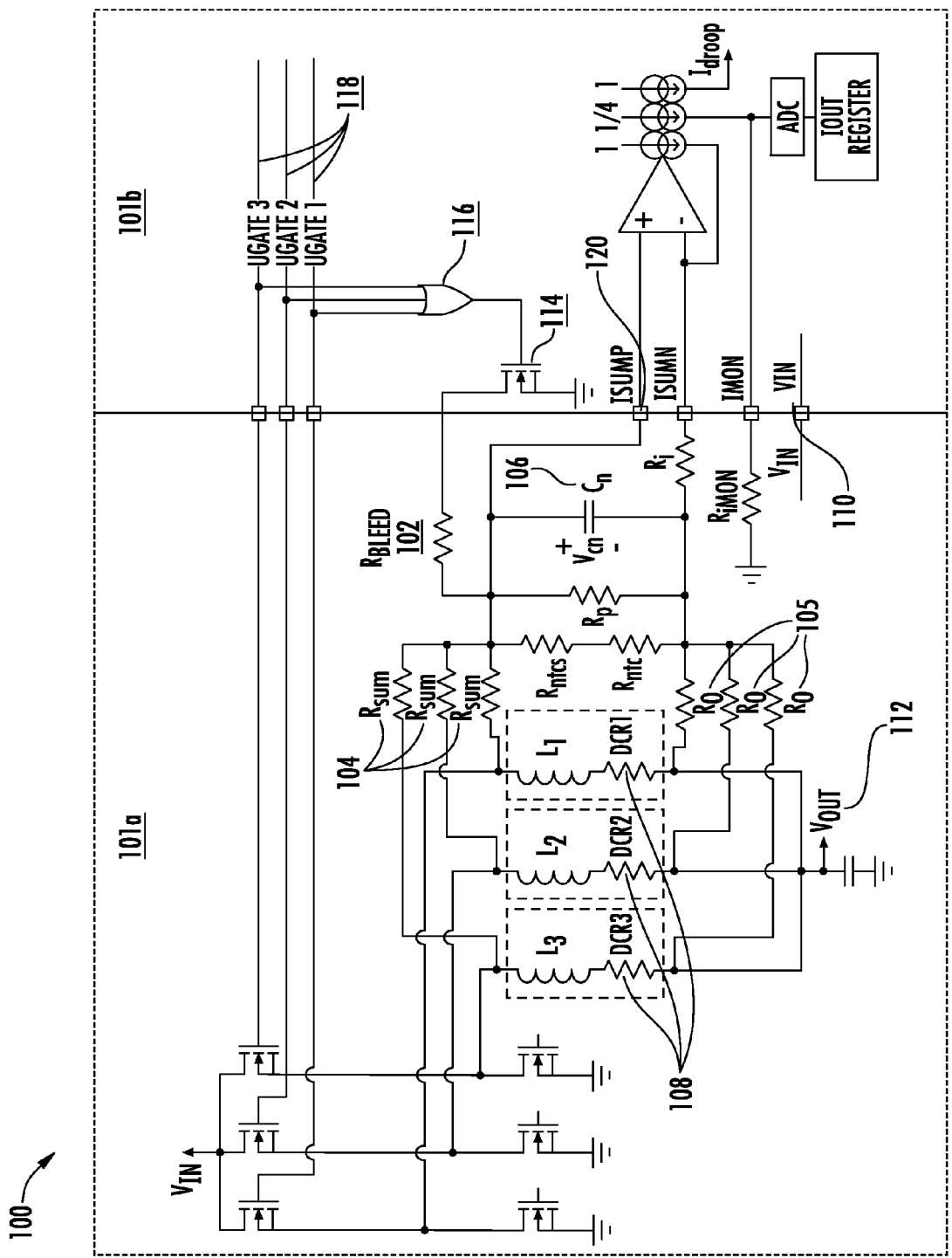

FIG. 1 is a diagram of an example multi-phase system 100 used for mitigating the resistor nonlinearity comprising an inductor DCR current sensing network 101a used in a single phase or multiphase voltage regulator coupled to pulse width modulation (PWM) controller integrated circuit (IC) 101b that provides for control for a voltage regulator (VR). This inductor DCR current sense system 101a and PWM controller IC 101b are used only as examples of how the embodiments described below can be implemented into such a system 100. However, other systems 100 can be used to implement the embodiments described below and more or less phases can be incorporated into the system 100. As stated above, this example system 100 can be used to mitigate the resistor nonlinearity in inductor DCR current sensing. More specifically, a resistor denoted $R_{BLEED}$ 102 is coupled from the node between the $R_{SUM}$ resistor 104 and the capacitor $C_n$ 106 to a switch 114. Moreover, in multi-phase systems 100, the system 100 has an OR gate 116, which activates $R_{BLEED}$ 102 only when one or more phases are "on". In single-phase embodiments, an OR gate 116 is not required. The OR gate 116 is coupled from the voltage regulator phases's on-state control signals 118 to the switch 114, which will couple $R_{BLEED}$ 102 to ground by activating the switch 114 when one or more of the phases's on-state control signals 118 are on their "on" state. In an example, the switch 114 can be an n-channel FET. Moreover, in some embodiments, the switch 114 can be integrated into the pulse width modulation (PWM) controller integrated circuit (IC) 101b. In some embodiments there may be level translators between UGATE signals 118 and the logic level input signals of OR gate 116. Furthermore, it is understood that the high side switching transistors may be p-channel MOSFETs (instead of the shown n-channel MOSFETs) and in this case there may be inverters between the UGATE signals 118 and the inputs of OR gate 116.

As a result of this configuration $R_{BLEED}$ 102 draws current that, depending on the selection of $R_{BLEED}$ 102, will be equivalent to the extra current resulting from the reduction of resistance in the filter/summing resistors 104 of the system 100 during the on-time. This extra current results from the decreased resistance of resistors 104 when a higher voltage is applied across the resistors 104. In some embodiments, the value of $R_{BLEED}$ 102 is chosen such that the effects of the resistor 104 nonlinearity are eliminated or sufficiently reduced in a nominal case. That is, in an exemplary embodiment, the ideal passive $R_{BLEED}$ 102 can be selected by configuring the voltage regulator (VR) for the nominal condition of interest, and varying the $R_{BLEED}$ 102 until the offset from the expected $V_{OUT}$ 112 (due to the designed value of VR loadline resistance multiplied by the applied load current) has been reduced to zero. This ideal $R_{BLEED}$ 102 value, however, can be highly dependent on operating conditions, as described below, and therefore, a compromise correction can be chosen over the range of operating conditions and range of component parametric variation so that at least acceptable (i.e., system specification tolerance compliant) performance is achieved in all cases.

As mentioned above, there can be a number of conditions that influence the nonlinearity of resistance due to varying voltage drops. Those conditions, which can be used to select $R_{BLEED}$ 102, may include the voltage coefficient of resistance with respect to voltage of the $R_{SUM}$ resistors 104, the magnitude and variability of the $V_{VIN}$ 110, the range of programmed $V_{OUT}$ 112, and the number of voltage regulator phases that are enabled in all the supported power states.

The expected range of $V_{VIN}$ 110, in particular, can be important in determining the viability of this embodiment, and the selection of the $R_{BLEED}$ 102 value, because battery powered systems (e.g., notebook computers) can experience large variations in $V_{VIN}$ 110 ranging from battery depleted to battery fully charged, and beyond if the system is operating directly from the battery charging supply.

The programming of the $V_{OUT}$ 112 has a smaller but still non-negligible effect on the nonlinearity error. The on-time voltage applied to the $R_{SUM}$ 104 resistors is $V_{VIN}$ 110–$V_{ISUMP}$ 120, which is approximately the same as $V_{VIN}$ 110–$V_{OUT}$ 112. The off-time (negative) $R_{SUM}$ 104 applied voltage is 0–$V_{ISUMP}$ 120, again approximately –$V_{OUT}$ 112 since, in many embodiments, $R_O$'s 105 are typically very small (i.e., 1-10 ohms, with very little current flowing through them). Since the resistor nonlinearity effect is due to the comparative effective $R_{SUM}$ 104 resistance in these two conditions, the resistor nonlinearity effect depends on both $V_{VIN}$ 110 and $V_{OUT}$ 112.

The number of active phases can also have an impact on the ideal $R_{BLEED}$ 102 value. All active phases contribute to the nonlinearity error additively. However, any disabled phase will contribute no error because the voltage drop across each phases respective $R_{SUM}$ 104 will be zero at all time during the switching cycle. With all phases enabled the greatest bleed correction is required.

This system 100 accommodates changes in the number of active phases in multiphase systems and to the changes in duty cycle, which may be due to changing programmable $V_{OUT}$ 112, varying $V_{VIN}$ 110, and system losses due to changes in ambient temperature and output load current. Changes in duty cycle resulting from load changes occur in all modes of regulator operation, but are especially pronounced in Discontinuous Mode (DCM) operation; this embodiment directly addresses this cause of current sense error. More specifically, by applying a bleed resistance 102 only when an active phase is in its "on" state, many of the design compromises to accommodate varying operational conditions can be avoided. Since in most load and operational conditions, the on-times of the active phases are interleaved, the nonlinearity correction will be applied proportionally to the number of active phases. Note that in response to large load and voltage programming transient events, there can be times when multiple phases are in their on-state at the same time; these episodes are typically infrequent and very brief because of the large ratio of $V_{VIN}$ 110 to $V_{OUT}$ 112, reverting to only one phase active at a time for the majority of time. Despite the limited utility in doing so, in some embodiments, a bleed resistor 102 can be incorporated into the system 100 for each phase, each with its own switch to ground, which is turned on when and only when that phase is in its on-state. This embodiment would correct the small and infrequent error incurred with the single-resistor/switch approach whenever multiple phases are in their on-states simultaneously.

The impact of duty cycle variation (in response to any cause, such as input voltage, output voltage, load current, etc) is accommodated by the system 100 since the correcting $R_{BLEED}$ 102 is applied only while a phase is experiencing the high voltage resistor 104 nonlinearity during its phase on-time. Any operating conditions that affect duty cycle will be ideally corrected, including DCM operation at low load. So $R_{BLEED}$ 102 is chosen to correct the erroneous extra current at its actual amplitude only while it is occurring (during the on-time), rather than to bleed off that erroneous extra current averaged over the entire switching cycle using an unswitched (permanently connected), typically high resistance bleed resistor. Because of the switched-resistor implementation, the $R_{BLEED}$ 102 can perhaps be 100 to 300 times the nominal $R_{SUM}$ 104, rather than a much higher resistance value needed for a permanently connected bleed resistor, another advantage in addition to the duty-cycle and active phase count tracking behavior of the switched bleed resistor implementation.

FIG. 2A is a diagram of another example system 200a used to mitigate the resistor nonlinearity in inductor DCR current sensing. The non-labeled circuit elements in system 200a (and systems 200b-300b below) can be similar to the circuit elements in system 100. In this embodiment, a correcting bleed current is applied to the ISUMP node 230 by a controlled current source 222 (which is dependent on a bleed control current $I_{BLEEDCONTROL}$ 232 and may scale the value of $I_{BLEEDCONTROL}$ 232 depending on its gain) when a phase's on-state is active, as indicated by an on-state control signal 118 being in its on-state. The bleed current provided by the controlled current source 222, as controlled by $I_{BLEEDCONTROL}$ 232, is adjusted to match the effect of the $R_{SUM}$ 104 nonlinearity by continuously monitoring the error induced by the $R_{SUM}$ 104 nonlinearity, as determined by the nonlinearity of a model resistor, $R_{MODEL}$ 224, of the same type as the $R_{SUM}$ 104 resistors. Stated another way, the controlled "bleed" current source(s) 222 will be adjusted to subtract the current from the ISUMP node 230 equal to the extra current from $V_{VIN}$ 110 to ISUMP 230 during the on-time resulting from the reduction in the $R_{SUM}$ 104 resistance due to the resistor nonlinearity. The magnitude of this extra current will be determined by subtracting the modeled on-state $R_{SUM}$ 104 ideal current from the measured actual current. In some embodiments, for the atypical case that the resistor nonlinearity results in an increase in actual resistance when a higher differential voltage is applied, this discussion allows the computed bleed current to be negative. Due to the implementation of the bleed current in this example, unlike system 100, this system 200a can automatically and continuously adjust to variations in the effect of the resistor nonlinearity due to changing input and output voltage changes and component parametric variations inherent in the resistor manufacturing process. As a result, this embodiment does not require the tuning or selection of the appropriate degree of mitigation as described in system 100. Instead, it produces the best bleed current automatically.

As stated above, the bleed current provided by the controlled current source 222 is adjusted to match the effect of the $R_{SUM}$ 104 nonlinearity by continuously monitoring the error induced by the nonlinearity, as determined by the nonlinearity of a model resistor, $R_{MODEL}$ 224, wherein $R_{MODEL}$ 224 is chosen to be similar to $R_{SUM}$ 104. After which, the $I_{BLEEDCONTROL}$ 232 fed into the controlled current source 222, which controls the bleed current provided to the ISUMP node 230, is adjusted to match the characterized nonlinearity current of a representative model resistor, $R_{MODEL}$ 224.

$R_{MODEL}$ 224 can be chosen to possess two properties. First, $R_{MODEL}$ 224 can have the same nominal resistance to that of the $R_{SUM}$ 104 resistors. And second, $R_{MODEL}$ 224 can have a voltage coefficient similar to that of the $R_{SUM}$ 104 resistors; i.e., the nonlinearity of $R_{MODEL}$ 224 with respect to voltage can be similar to that of each and every $R_{SUM}$ 104 resistor. $R_{MODEL}$ 224 can be assumed to be sufficiently similar to the $R_{SUM}$ 104 resistors in both nominal resistance and voltage nonlinearity if $R_{MODEL}$ 224 is taken from the same manufacturing lot as each and every $R_{SUM}$ 104 resistor. This requirement can be met if the manufacturing process mandates that both $R_{MODEL}$ 224 and each and every $R_{SUM}$ 104 device be obtained from the same component reel. If so, then the matching of the so-obtained $I_{BLEEDCONTROL}$ 232 will be accurate to the extent that the essential parameters of resistors from the same reel are matched. Typically, actual resistance is within a specified tolerance of nominal resistance, which is typically 1% in computing power voltage regulator applications. While the nonlinearity of many formulations of resistors, such as thick film resistors, is not specified, there is an inherent similarity in devices manufactured from the same formulation by the same process, such as resistors of the same nominal value provided in the same component reel. As a result, the following derivation will assume that sufficient matching of the essential resistor device parameters of all the $R_{SUM}$ 104 resistors and $R_{MODEL}$ 224 has been obtained.

After $R_{MODEL}$ 224 is chosen appropriately as described above, the nonlinearity of $R_{SUM}$ 104 can be modeled by $R_{MODEL}$ 224 in the following way. $V_{VIN}$ 110 can be applied to the switched terminal 225 of $R_{MODEL}$ 224 via an internal switch 228 to VIN 226. The other terminal 227 of $R_{MODEL}$ 224 is held at $V_{ISUMP}$ 230 potential by a transconductance amplifier 228, and the amplifier current required to do so is stored as $I_{FromVIN}^{actual}$ in $I_{BLEED}$ COMPUTATION 234. Then, a ground 229 can be applied to the switched terminal 225 of $R_{MODEL}$ 224, again holding the other terminal 227 at $V_{ISUMP}$ 230, and store the amplifier current required to do so as $I_{ToGND}$. These two sequential operations can be repeated rapidly to maintain updated amplitudes of these stored currents for further processing to produce a bleed current reference that tracks the varying $V_{VIN}$ 110 and $V_{ISUMP}$ 230 voltages and the voltage dependent nonlinearity error. The instantaneous voltages $V_{ISUMP}$ 230 and $V_{VIN}$ 110 can be used to compute $I_{BLEEDCONTROL}$ 232.

Once $R_{MODEL}$ 224 is modeled after $R_{SUM}$ 104, the $I_{BLEEDCONTROL}$ 232 can be derived as follows. First, the ideal on-time current can be estimated from VIN to ISUMP with the computational assumption that an idealized voltage-independent $R_{SUM}$ 104 (or $R_{MODEL}$ 224) during the on-time is equal to the measured $R_{SUM}$ 104 (or $R_{MODEL}$ 224) during the off-time, i.e. is equal to the "nominal" (for this operating condition) resistance value. This value is derived by noting that by Ohm's law, $$\frac{V_{ISUMP}}{I_{ToGND}} = R_{MODEL} 224.$$

For the idealized voltage-invariant $R_{MODEL}$ 224, $V_{VIN}$ 110 – $V_{ISUMP}$ 230 = $I_{FromVIN}^{ideal} \times R_{MODEL}^{ideal}$. Next, $R_{MODEL}^{ideal}$ can be eliminated (under the adopted convention that $R_{MODEL} = R_{MODEL}^{ideal}$) and solving for $I_{FromVIN}^{ideal}$ yields $$I_{FromVIN}^{ideal} = \frac{(V_{VIN} - V_{ISUMP}) \times I_{ToGND}}{V_{ISUMP}}.$$

The desired $I_{BLEEDCONTROL}$ 232 will then be the difference between the measured $R_{MODEL}$ 224 current from VIN to ISUMP and the idealized, which yields $I_{FromVIN}^{ideal}$. $I_{BLEED} = I_{FromVIN}^{actual} - I_{FromVIN}^{ideal}$, or $$I_{BLEED} = I_{FromVIN}^{actual} - \frac{(V_{VIN} - V_{ISUMP}) \times I_{ToGND}}{V_{ISUMP}}.$$

This is the equation for the $I_{BLEEDCONTROL}$ 232 that can be computed using $I_{BLEED}$ COMPUTATION 234, which controls the bleed current applied to the ISUMP node 230 by the controlled current source 222 whenever any phase is in the on-state. Note, this is only one example for $I_{BLEED}$ COMPUTATION 234 and other examples can be used for $I_{BLEED}$ COMPUTATION 234 that track an estimate of the $I_{BLEEDCONTROL}$ 232 for the instantaneous operating conditions and the physical and electrical properties of the $R_{SUM}$ 104 resistors.

In some embodiments, the controlled current source 222 is enabled only when one or more phases are in their "on" states by coupling an OR switch 116 from the phases's on-state control signals 118 to the controlled current source 222, and thus inheriting the duty-cycle and phase count tracking attributes of system 100. In other embodiments, the bleed current, as controlled by $I_{BLEEDCONTROL}$ 232, can be applied by multiple independent controlled current sources 222, which will apply the correct total current regardless of whether multiple phases are in the on-state simultaneously, as shown in FIG. 2B. That is, a controlled current source 222 is dedicated to each phase. The controlled current sources 222 can be enabled only when each controlled current source's 222 respective phase is in the on-state, as commanded by its on-state control signal 118. Since the controlled current source or sources 222 can be integrated into the controller, and are all connected to the ISUMP node 230 within the PWM controller IC, multiple independently-gated controlled current sources 222, one per phase in a multiphase regulator, can be used without increasing the number of external interconnections required. Or, in some embodiments there can be multiple controlled current sources 222, but fewer than the number of phases, with each controlled current source 222 not necessarily dedicated to a particular phase, but instead, shared such that the number of controlled current sources 222 enabled simultaneously equals the number of phases in the on-state, up to the number of current sources provided. These embodiments can eliminate the errors incurred during the times when more than one phase is in its on-state simultaneously, by applying the correct total bleed current for a multiplicity of on-state phases simultaneously for the duration of their respective on-times.

FIG. 3A is a diagram of another example system 300a used to mitigate the resistor nonlinearity in inductor DCR current sensing. In this embodiment, the differential voltage $V_{VIN}$ 110−$V_{ISUMP}$ 230 is applied to a bleed current programming resistor, $R_{PROG}$ 336, to produce a reference current that varies proportionally as $V_{VIN}$ 110−$V_{ISUMP}$ 230 varies. This reference current will be scaled using an $I_{BLEED}$ Scaler 334 by a fixed ratio to produce the computed $I_{BLEEDCONTROL}$ 332 which determines the bleed current that will be drawn from the ISUMP node 230 to correct for the $R_{SUM}$ 104 nonlinearity. The bleed current switching concept of system 200a, in which the correcting bleed current is applied when one or more phases's on-state control signal 118 is commanding its on-state, is also utilized in this embodiment. Therefore, in this embodiment, a nonlinearity correcting bleed current like that of system 200a and 200b is rendered, except that this bleed current, which is controlled by $I_{BLEEDCONTROL}$ 332, is functionally dependent on the varying value of $V_{VIN}$ 110 and $V_{ISUMP}$ 230, and thus indirectly on the value of $V_{OUT}$ 112. In embodiments which $V_{VIN}$ 110 is a battery, this embodiment beneficially adjusts $I_{BLEEDCONTROL}$ 332 as $V_{VIN}$ 110 varies from the fully charged battery voltage (or possibly higher while the battery charging supply is in use), at which the $R_{SUM}$ 104 nonlinearity error current is greatest, to the lower nearly-depleted battery voltage at which the $R_{SUM}$ 104 nonlinearity error current is at its lowest. In some embodiments, $R_{PROG}$ 336 might be selected to be the value that best corrects the $R_{SUM}$ 104 nonlinearity error of a representative system at an intermediate value of $V_{VIN}$ 110 and that $I_{BLEEDCONTROL}$ can vary favorably as $V_{VIN}$ 110 deviates from that intermediate value.

Similar to systems 200a and 200b, this embodiment 300a allows $I_{BLEEDCONTROL}$ 332 to still adapt to changes in the input voltage 110 and output voltage 112. The system designer can determine empirically the nominal (and assumed fixed) extent of $R_{SUM}$ 104 voltage coefficient of resistance nonlinearity error to be corrected. In doing so, the voltage coefficient of resistance of the $R_{SUM}$ resistors 104 is assumed to be essentially invariant, where a designer can then determine what the nominal voltage coefficient of resistance will be. Moreover, one can assume that the value of the resistance of the $R_{SUM}$ resistors 104 can be assumed to be constant over the expected range of the setting of the regulator output voltage 112. This assumption is often valid since the full range of output voltage 112 settings typically vary little compared the switching regulator input voltage 110, and thus, the variation of voltages applied to the resistive material may be sufficiently low to permit an assumption of constant voltage coefficient of resistance over this range of operating conditions.

Similar to system 200a, in some embodiments, the controlled current source 222 in system 300a is enabled only when one or more phases are in their "on" states by coupling an OR switch 116 from the phases's on-state control signals 118 to the controlled current source 222, and thus inheriting the duty-cycle and phase count tracking attributes of systems 100 and 200a. In other embodiments, and similar to system 200b, the bleed current can be applied by multiple independent current sources 222, which will apply the correct total current when multiple phases are in the on-state simultaneously, as shown in FIG. 3B. The controlled current sources 222 can then be enabled only when each controlled current source's 222 respective phase is in its on-state, as indicated by its on-state control signal 118. Since the controlled current source or sources 222 can be integrated into the controller, and are all connected to the ISUMP node 230 within the controller, multiple independently-gated controlled current sources 222, one per phase in a multiphase regulator, can be used without increasing the number of external interconnections required. Or, in some embodiments there can be multiple controlled current sources 222, but fewer than the number of phases, with each controlled current source 222 not necessarily dedicated to a particular phase, but instead, shared such that the number of controlled current sources 222 enabled simultaneously equals the number of phases in the on-state, up to the number of current sources provided. These embodiments might be useful in the case that a multiphase regulator may require that in response to changing output voltage setting or in response to load transient events, multiple phases are in the on-state simultaneously. These embodiments can eliminate the errors incurred during the times when more than one phase is in its on-state simultaneously, by applying the correct total bleed current for a multiplicity of on-state phases simultaneously for the duration of their respective on-times.

In some other embodiments, the external bleed current programming resistor, $R_{PROG}$ 336, in FIGS. 3A and 3B can be replaced by an internal current reference devised to be proportional to $V_{VIN}$ 110−$V_{ISUMP}$ 230, with the proportionality determined by a programmable scaling factor 338 via a digital programming interface, to produce the $I_{BLEEDCONTROL}$ 332, as shown in FIG. 3C. In some embodiments, the digital programming interface can be a serial communication bus or other programming interface. The bleed current, as controlled by $I_{BLEEDCONTROL}$ 332, is then applied to the ISUMP node 230 as a bleed current when one or more switching phases are in their on-state by coupling an OR switch 116 from the phases's on-state control signals 118 to the controlled current source 222 or by having multiple independently-gated controlled current sources 222, one per phase in a multiphase regulator (not shown).

Replacing $R_{PROG}$ 336 with a $V_{VIN}$ 110−$V_{ISUMP}$ 230 proportional reference current and programmable scaling factor 338 has the advantage of not requiring any additional external connections to the PWM controller IC 101b, which can be a valuable attribute in systems for which input/output connections are scarce. It also allows programming of the nonlinearity correction via PWM controller IC 101b initialization firmware, which may permit adjustment of the nonlinearity correction in response to configuration data representing the hardware implementation throughout the manufacturing lifetime of the PWM controller IC 101b.

In the case of a power management integrated circuit (PMIC) containing multiple voltage regulators (each either single or multi-phase), the $R_{PROG}$ 336 interconnection and $I_{BLEED}$ computational or scaling circuitry and programming 234 or 334 or any resources required for any embodiment described above can be shared by all voltage regulators by replacing the connection to a voltage reference of a particular regulator's ISUMP node 230 with a connection to a common reference voltage, such as a resistive average of all regulators' ISUMP nodes 230 or the average of all the command reference voltages. Since the different output voltages 112 of the multiple voltage regulators in a PMIC are typically similar in amplitude when compared to the difference between any particular output voltage 112 and the (typically) common input voltage 110, the deviation of the commonly derived $I_{BLEEDCONTROL}$ 232 and 332 from the ideal bleed current for any of them is likely to be small.

In other embodiments for a PMIC, a common means of programming a $I_{BLEEDCONTROL}$ 232 and 332 reference can be utilized that may be directly responsive to common $V_{VIN}$ 110, but may be applied to each voltage regulator according to a functional dependence on the programmed output voltage 112, or sensed output voltage (such as at the ISUMP node 230 or ISUMN node 221) of each voltage regulator. Such means would compensate, by some functional relationship of each regulator's output voltage 112 to the derived common reference $I_{BLEEDCONTROL}$ 232 and 332, for the difference in output voltage 112 provided by each voltage regulator. This compensation may also be directed and scaled for each voltage regulator via the PMIC's serial interface bus with the host processor commanding the PMIC. The advantage so obtained would be a better approximation of the ideal $I_{BLEEDCONTROL}$ 232 and 332 mitigation to be applied to each voltage regulator without the additional cost (in circuit size, and especially in added interconnections) required for fully individualized programming of each voltage regulator's $I_{BLEEDCONTROL}$ 232 and 332, compared to fully independent bleed current programming.

For any PMIC method in which the derivation/computation of the $I_{BLEEDCONTROL}$ 232 and 332 includes mechanisms that are shared in whole or in part by more than one voltage regulator, the switching means, whereby the bleed current (or multiplicity of bleed currents) is applied to each respective ISUMP node 230 whenever a voltage regulator's phase is in the on-state, should still be provided individually and independently for each voltage regulator. Doing so provides all of the duty cycle and phase count tracking advantages of systems 100-300b at little or no additional cost, because all such required interconnections and replication of bleed current sources can be made internally to the PMIC.

FIG. 4 is a block diagram of an example system 400 including a power conversion system 402 that includes a circuit 403 that mitigates resistor nonlinearity. System 400 includes one more power conversion systems 402 coupled to one or more processing devices 404 and one or more memory devices 406. The one or more power conversion systems 402 can receive unregulated power (e.g., line power, battery), regulate the power, and provide regulated power to the one or more processing devices 404 and one or more memory devices 406. In at least one embodiment, the power conversion system 402 is implemented as one or more of the power converters 100-300c with at least one circuit element 403 that mitigates resistor non-linearity errors as discussed above in FIGS. 1-3C. In an embodiment, the one or more processing devices 404 can include a central processing unit (CPU), microcontroller, microprocessor (e.g., a digital signal processor (DSP)), field programmable gate array (FPGA), application specific integrated circuit (ASIC), or other processing device. Moreover, in an embodiment, the one or more memory devices 406 can include a conventional hard disk, volatile or non-volatile media such as a solid state hard drive, random access memory (RAM) including, but not limited to, synchronous dynamic random access memory (SDRAM), double data rate (DDR) RAM, RAMBUS dynamic RAM (RDRAM), static RAM (SRAM), etc.), electrically erasable programmable ROM (EEPROM), and flash memory, etc. The one or more processing devices 404 can be communicatively coupled to the one or more memory devices 406.

In other examples, such a power conversion system 402 can provide regulated power to other functional circuits instead of or in addition to one or more processing devices 404 and one or more memory devices 406. For example, such a power conversion system 402 can provide power to internal device components, peripheral devices, or other components. Such a power conversion system 402 can be included in any suitable electronic device using regulated power such as a desktop, laptop, or tablet computer, a set top box, battery charger, or other device.

Example Embodiments

Example 1 includes a power converter comprising: at least one power switch coupled to an input voltage; a pulse width modulation circuit for generating control pulses for the at least one power switch; at least one output inductor, wherein each of the at least one output inductors is coupled to a respective one of the at least one power switches; a current sensor coupled in parallel with the at least one output inductor for sensing current passing through all of the at least one output inductors, wherein the current sensor comprises at least one resistor for each of the at least one output inductors and at least one capacitor, and wherein the current sensor and the pulse width modulation circuit are coupled together at a current bleed node; and at least one circuit element coupled to the current bleed node, wherein the at least one circuit element bleeds a bleed current from the current bleed node when one or more of the at least one power switches is turned on.

Example 2 includes the power converter of Example 1, wherein the at least one circuit element is a bleed resistor and wherein when the pulse width modulation circuit generates a turn-on pulse for the at least one power switch the bleed resistor is coupled to ground via a switch.

Example 3 includes the power converter of any of Examples 1-2, wherein the at least one circuit element is at least one current controlled current source and wherein the bleed current is a current substantially proportional to the at least one resistor's resistance nonlinearity.

Example 4 includes the power converter of Example 3, wherein the bleed current is a positive current.

Example 5 includes the power converter of any of Examples 3, wherein the bleed current is a negative current.

Example 6 includes the power converter of any of Examples 3-5, wherein the bleed current is computed using a model resistor's resistance nonlinearity.

Example 7 includes the power converter of any of Examples 3-6, wherein the bleed current is dependent on a programmable scaling factor.

Example 8 includes a controller for a power converter, the controller comprising: a current sense input; a current sense circuit coupled to the current sense input at a current bleed node, wherein the current sense input monitors the current output of the power converter; a pulse width modulation circuit that generates control signals for at least one power switch that is coupled to an input voltage and is coupled to a respective output inductor, wherein the pulse width modulation circuit is configured to regulate an output voltage of the power converter; and at least one circuit element coupled to the current bleed node, wherein the at least one circuit element bleeds a bleed current from the current bleed node when one or more of the at least one power switches in the power converter is turned on.

Example 9 includes the pulse width modulation circuit of Example 8, wherein the at least one circuit element is a bleed resistor and wherein when the pulse width modulation circuit generates a turn-on signal for the at least one power switch and the bleed resistor is coupled to ground via a switch.

Example 10 includes the pulse width modulation circuit of any of Examples 8-9, wherein the at least one circuit element is at least one current controlled current source and wherein the bleed current is a current substantially proportional to at least one resistor's resistance nonlinearity.

Example 11 includes the pulse width modulation circuit of Example 10, wherein the bleed current is a positive current.

Example 12 includes the pulse width modulation circuit of any of Examples 10, wherein the bleed current is a negative current.

Example 13 includes the pulse width modulation circuit of any of Examples 10-12, wherein the bleed current is computed using a model resistor's resistance nonlinearity.

Example 14 includes the pulse width modulation circuit of any of Examples 10-13, wherein the bleed current is dependent on a programmable scaling factor.

Example 15 includes a method comprising: generating control signals for at least one phase of a power converter; monitoring the control signals to determine whether one or more of the at least one phase in the power converter is turned on; and bleeding a bleed current from a current bleed node in the power converter when one or more of the at least one phase is turned on.

Example 16 includes the method of Example 15, wherein bleeding a current comprises bleeding a current that is substantially proportional to a model resistor's resistance nonlinearity.

Example 17 includes the method of any of Examples 15-16, wherein bleeding a bleed current comprises bleeding a bleed current that is dependent on a programmable scaling factor.

Example 18 includes the method of any of Examples 15-17, wherein bleeding a bleed current comprises bleeding a current using a resistor when one or more of the at least one phase is turned on.

Example 19 includes the method of any of Examples 15-18, wherein bleeding a bleed current comprises bleeding a current using at least one current controlled current source when one or more of the at least one phase is turned on.

Example 20 includes the method of Example 19, wherein generating control signals comprises generating control signals for each of at least one phases of a power converter, the power converter having a plurality of phases and wherein bleeding a bleed current from a current bleed node comprises using a plurality of current controlled current sources, each of the plurality of current controlled current sources are used for a respective one of the plurality of phases.

Example 21 includes the method of any of Examples 19-20, wherein bleeding a bleed current comprises bleeding a positive current.

Example 22 includes the method of any of Examples 19-20, wherein bleeding a bleed current comprises bleeding a negative current.

Example 23 includes an electronic device comprising: one or more processing devices; one or more memory devices communicatively coupled to the one or more processing devices; and one or more power conversion systems coupled to the one or more processing devices and the one or more memory devices, the one or more power conversion systems including: at least one circuit that mitigates resistor nonlinearity errors in the one or more power conversion systems.

Example 24 includes the electronic device of Example 23, wherein the at least one circuit is coupled to a current bleed node in the one or more power conversion systems and wherein that at least one circuit bleeds a bleed current from the current bleed node when the one or more power conversion systems is turned on.

Example 25 includes the electronic device of Example 24, wherein the at least one circuit is a bleed resistor and wherein when the one or more power conversion systems is turned on the bleed resistor is coupled to ground via a switch.

Example 26 includes the electronic device of any of Examples 24-25, wherein the at least one circuit is at least one current controlled current source and wherein the bleed current is a current substantially proportional to at least one resistor's resistance nonlinearity included in the one or more power conversion systems.

Example 27 includes the electronic device of Example 26, wherein the bleed current is computed using a model resistor's resistance nonlinearity.

Example 28 includes the electronic device of any of Examples 26-27, wherein the bleed current is dependent on a programmable scaling factor.

Example 29 includes the method of any of Examples 26-28, wherein bleeding a bleed current comprises bleeding a positive current.

Example 30 includes the method of any of Examples 26-28, wherein bleeding a bleed current comprises bleeding a negative current.

Example 31 includes the electronic device of any of Examples 23-30, wherein the electronic device comprises one of desktop, laptop, or tablet computer, a set top box, or a battery charger.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   generating control signals for at least one phase of a power converter;
   monitoring the control signals to determine whether one or more of the at least one phase in the power converter is turned on; and
   bleeding a bleed current from a current bleed node in the power converter when one or more of the at least one phase is turned on.

2. The method of claim 1, wherein bleeding the bleed current comprises bleeding the current that is substantially proportional to a model resistor's resistance nonlinearity.

3. The method of claim 1, wherein bleeding the bleed current comprises bleeding the bleed current that is dependent on a programmable scaling factor.

4. The method of claim 1, wherein bleeding the bleed current comprises bleeding the bleed current using a resistor when one or more of the at least one phase is turned on.

5. The method of claim 1, wherein bleeding the bleed current comprises bleeding the bleed current using at least one current controlled current source when one or more of the at least one phase is turned on.

6. The method of claim 5, wherein generating control signals comprises generating control signals for each of at least one phases of the power converter, the power converter having a plurality of phases and wherein bleeding the bleed current from the current bleed node comprises using a plurality of current controlled current sources, each of the plurality of current controlled current sources are used for a respective one of the plurality of phases.

7. The method of claim 5, wherein bleeding the bleed current comprises bleeding a positive current.

8. The method of claim 5, wherein bleeding the bleed current comprises bleeding a negative current.

9. The method of claim 1, wherein the control signals comprise pulse width modulation (PWM) signals for controlling the on-time of the at least one phase of the power converter.

10. The method of claim 9, wherein controlling the on-time of the at least one phase of the power converter includes activating a high-side FET coupled to an input voltage using the PWM signals.

11. The method of claim 10, wherein activating the high-side FET includes causing the input voltage to form a regulated output voltage via the at least one phase of the power converter.

12. The method of claim 1, wherein bleeding the bleed current from the current bleed node includes coupling a bleed resistor that is coupled to the current bleed node to ground.

13. The method of claim 12, wherein coupling the bleed resistor to ground includes activating a switch that is coupled between the bleed resistor and ground.

14. The method of claim 1, further comprising:
sensing a phase current passing through an inductor in the power converter,
wherein bleeding the bleed current from the current bleed node in the power converter reduces error in the sensing of the phase current through the inductor.

15. The method of claim 14, wherein sensing the phase current includes determining a voltage drop across a resistor coupled to the inductor at the current bleed node.

16. The method of claim 15, wherein bleeding the bleed current from the current bleed node reduces a nonlinearity of the resistor due to varying voltage drops.

* * * * *